United States Patent Office 2,836,089
Patented May 27, 1958

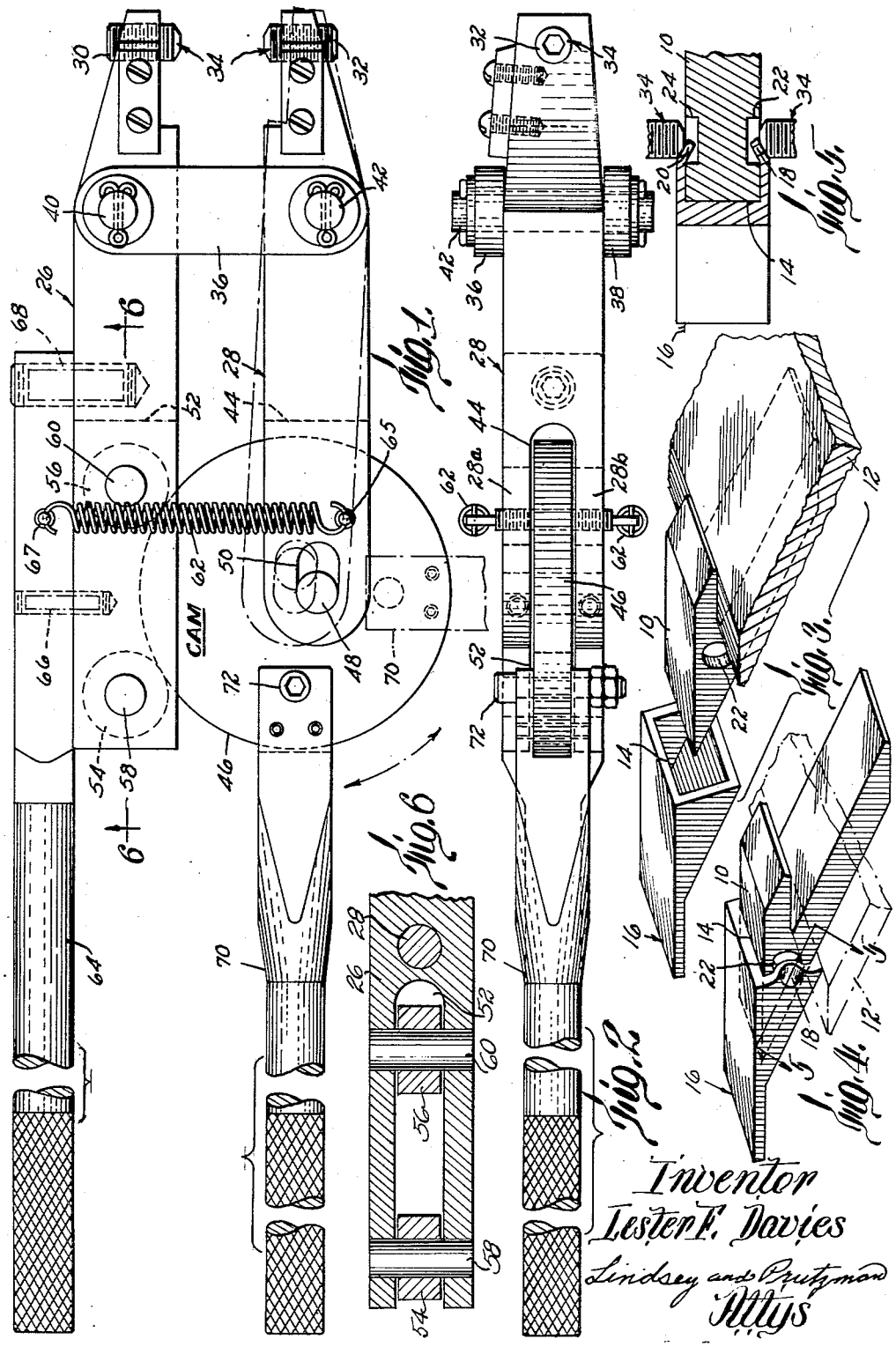

2,836,089

PLIER-TYPE CRIMPING TOOL FOR ASSEMBLING TEETH ON EXCAVATOR BUCKETS

Lester F. Davies, Windsor, Vt., assignor to Cone Automatic Machine Company, Inc., Windsor, Vt., a corporation of Vermont Application July 20, 1956, Serial No. 599,266

3 Claims. (Cl. 81—15)

This invention relates to a novel and improved tool for use in assembling teeth on a bucket of an excavator apparatus.

It is usual practice to provide excavator buckets with teeth each comprising two portions, the first being a fixed tooth portion permanently attached to the bucket rim and the second portion being an auxiliary or replaceable working tooth portion which is detachably mounted on the main tooth portion. The provision of a removable tooth portion permits the replacement of the working portion of the bucket teeth as it becomes worn. Heretofore the assembly of the auxiliary or replaceable tooth portion with the fixed tooth portion has usually been accomplished by the use of a sledge hammer and hand peening tools. Obviously such a manner of assembling the bucket teeth is necessarily very slow and particularly undesirable in situations where the teeth must be changed quite often in the field.

It is therefore the object of this invention to provide a novel and improved tool for assembling excavator bucket teeth in the field which will permit speedy assembly of the teeth with a minimum of physical effort on the part of the operator.

It is further an object of this invention to provide a tool of the type described which is simple to manufacture and to use but which is rugged and capable of extended trouble-free usage in the field.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 1 is a fragmentary plan view of a bucket tooth assembling tool constructed in accordance with the invention;

Fig. 2 is a fragmentary side elevational view of the tool of Fig. 1;

Fig. 3 is a fragmentary exploded perspective view of an excavator bucket illustrating the relative disposition of the fixed and removable tooth portions;

Fig. 4 is a view similar to Fig. 3 with the fixed and removable teeth assembled;

Fig. 5 is a fragmentary cross sectional view taken along the lines 5—5 of Fig. 4; and Fig. 6 is a fragmentary cross sectional view substantially along the line 6—6 of Fig. 1.

In order to better understand the operation and use of the tool to be hereinafter described, in Fig. 3 is shown a more or less conventional configuration of an excavator bucket tooth. A main or fixed tooth portion 10 is secured by suitable means such as welding to the floor 12 of the excavator bucket. The outer end of the fixed tooth portion is somewhat wedge-shaped and is engageable within the recess 14 of the auxiliary or removable tooth portion 16. With reference to Figs. 4 and 5, it can be seen that with the auxiliary or removable tooth 16 assembled on the fixed tooth portion 10 the end of the side walls of the removable tooth 16, as at 18 and 20, are in registry with a pair of recesses 22 and 24 in the sides of the fixed tooth 10. The side walls of the removable tooth 16 may be deformed inwardly of the recesses 22 and 24 to retain the tooth portions 10 and 16 assembled as shown in Fig. 4, while permitting disassembly thereof, when necessary, due to wearing of the auxiliary or removable tooth 16.

In accordance with the invention, there has been provided a new and improved tool for deforming the side walls of the removable tooth 16, as above described. With reference to Figs. 1 and 2 a tool constructed in accordance with the invention is comprised of a pair of arms 26 and 28. Each of the arms carries at one end thereof, as at 30, 32 respectively, a deforming element 34. In the specific embodiment, the deforming elements are setscrews threadably received in the arms whereby the spacing of the deforming elements may be selectively adjusted to suit any particular application.

A pair of links 36, 38 are pivotally mounted at each end to the arms 26 and 28, as at 40 and 42 on either side of the arms. The arm 28 is bifurcated to form legs 28a, 28b at its end opposite the deforming element 34. The spaced apart legs 28a, 28b form a slot 44 extending longitudinally of the arm. A circular disc or cam 46 is disposed within the slot 44 and is mounted on a shaft or pin 48 which is slidably engaged in an elongated aperture, such as 50, in each of the legs 28a, 28b.

The arm 26 is similarly provided with a longitudinal slot 52 in the end thereof opposite the deforming element 34. A pair of rollers 54 and 56 are disposed in the slot 52 and are rotatably mounted on pins or shafts 58 and 60 respectively, mounted in the arm 26, as shown in Fig. 6.

An elongated operating handle 64 is mounted on the arm 26 such as by screws 66, 68 and a handle 70 is mounted on the cam 46, as at 72, for rotation with the cam 46. Springs 62 connected at either end, as at 65 and 67 to the arm 28 and handle 64, respectively, are disposed on opposite sides of the arms to urge the cam 46 and rollers 54, 56 into engagement and to pivot the arms toward each other to open the deforming elements 34.

In the use of the tool, the handle 70 is first moved to the dotted line position shown in Fig. 1 wherein the cam 46 will be rotated relative to the rollers 54, 56 to permit the springs 62 to urge arm 28 in a clockwise direction relative to the arm 26 thus moving the arm to the dotted line position shown in Fig. 1 and opening the deforming elements 34. The tool is then engaged with the removable tooth portion 16 approximately as shown in Fig. 5, and the handle 70 moved toward the handle 64 to rotate the cam 46 in a clockwise direction. This rotation of the cam 46 will of course result in the arm 28 being pivoted in a counterclockwise direction toward the solid line position shown in Fig. 1 to close the deforming elements 34 and deform the side walls of the removable tooth portion as shown in Fig. 5.

It should be apparent that with a tool constructed in accordance with the invention it is possible to provide the extremely high force necessary to deform the removable tooth 16 with only a very moderate effort by the user. The adjustable mounting of the deforming elements 34 permit the elements to be set at the spacing optimum for a particular width of the removable tooth, thus assuring that substantially all of the movement of the deforming elements will be available for deformation of the removable tooth as described.

The tool is simple and economical to fabricate and is obviously extremely rugged to assure its capability of satisfactorily performing the purpose intended. Thus it can be seen that there has been provided a novel and improved tool for assembling excavator bucket teeth, particularly in the field, at a rate far surpassing that which could be accomplished by methods and tools heretofore available.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. A tool for assembling fixed and removable teeth of an excavator bucket comprising a pair of spaced apart substantially parallel arms, means pivotally connecting said arms adjacent one end thereof, one of said arms having a handle at its end opposite said one end thereof, a cam rotatably mounted on the other of said arms, said cam being engageable with said one arm to control the spacing of said one end of the arms, and means to rotate the cam to provide relative movement of said arms.

2. A tool for assembling fixed and removable excavator bucket teeth comprising a pair of spaced apart arms pivotally connected adjacent one end, a rotatable circular cam eccentrically mounted adjacent the other end of one of said arms, a pair of rollers mounted on the other arm engageable with said cam, a spring urging said cam and rollers into engagement, said other arm having a handle at its end opposite said one end thereof, and an operating handle mounted on said cam for rotation therewith.

3. A tool for assembling fixed and removable excavator bucket teeth comprising a pair of spaced apart substantially parallel arms, a pair of oppositely facing deforming elements respectively carried at the outer end of each arm, means mounting said deforming elements for adjustment relative to each other and to said arms, a link pivotally connecting said arms adjacent said outer end thereof, a cam rotatably mounted on the other end of one of the arms, a handle on said other arm at its end opposite said outer end thereof said cam being engageable with the other arm intermediate said handle and said outer end thereof to control the relative spacing of said deforming elements, and an operating handle mounted on said cam for movement therewith.

References Cited in the file of this patent

UNITED STATES PATENTS

| | | |
|---|---|---|
| 1,485,731 | Stangbye | Mar. 4, 1924 |
| 1,910,839 | Jensen | May 23, 1933 |
| 2,382,292 | Carlson | Aug. 14, 1945 |
| 2,569,424 | Mayhew et al. | Sept. 25, 1951 |

FOREIGN PATENTS

| | | |
|---|---|---|
| 487,107 | Germany | Dec. 4, 1929 |
| 717,132 | Great Britain | Oct. 20, 1954 |